United States Patent
Sin

(10) Patent No.: US 7,227,583 B2
(45) Date of Patent: Jun. 5, 2007

(54) DIGITAL TV METHOD FOR SWITCHING CHANNEL AUTOMATICALLY

(75) Inventor: Su Hyun Sin, Daegu (KR)

(73) Assignee: LG Electronics Inc., Seoul (KR)

( * ) Notice: Subject to any disclaimer, the term of this patent is extended or adjusted under 35 U.S.C. 154(b) by 602 days.

(21) Appl. No.: 10/403,050

(22) Filed: Apr. 1, 2003

(65) Prior Publication Data

US 2004/0114052 A1 Jun. 17, 2004

(30) Foreign Application Priority Data

Dec. 11, 2002 (KR) ...................... 10-2002-0078822

(51) Int. Cl.
*H04N 5/44* (2006.01)
*H04N 5/50* (2006.01)
*H04N 5/445* (2006.01)
*H04N 7/00* (2006.01)
*H04N 7/10* (2006.01)
*H04N 7/025* (2006.01)
*H04N 7/17* (2006.01)
*H04N 11/00* (2006.01)

(52) U.S. Cl. ...................... 348/570; 348/461; 348/473; 348/474; 348/563; 348/725; 348/731; 348/734; 725/32; 725/34; 725/35; 725/38; 725/50; 725/56; 725/57; 725/58; 725/131; 725/146

(58) Field of Classification Search ................ 348/563, 348/569–570, 461, 473, 474, 734, 725–727, 348/731; 725/32, 34, 35, 38, 50, 58, 134, 725/142, 146, 56, 57, 131, 132, 139, 140, 725/151, 152

See application file for complete search history.

(56) References Cited

U.S. PATENT DOCUMENTS

| 5,485,518 | A | * | 1/1996 | Hunter et al. .................. 725/28 |
| 5,600,378 | A | * | 2/1997 | Wasilewski .................. 348/468 |
| 5,659,366 | A | * | 8/1997 | Kerman ........................ 725/34 |
| 5,731,844 | A | * | 3/1998 | Rauch et al. .................. 725/40 |
| 5,786,845 | A | * | 7/1998 | Tsuria .......................... 725/32 |
| 6,271,893 | B1 | * | 8/2001 | Kawaguchi et al. ........ 348/725 |
| 6,317,168 | B1 | | 11/2001 | Seo |
| 6,353,444 | B1 | * | 3/2002 | Katta et al. .................. 715/716 |

(Continued)

FOREIGN PATENT DOCUMENTS

CN 1127966 7/1996

(Continued)

*Primary Examiner*—Brian P. Yenke
(74) *Attorney, Agent, or Firm*—Birch, Stewart, Kolasch & Birch, LLP

(57) ABSTRACT

A digital TV and a method of switching a channel automatically thereof provides a viewer with advance notice of an automatic channel switch using linkage descriptor information on HD broadcasting. Providing the viewer with notice of the switched channel reduces viewer confusion. The method includes the steps of determining whether a linkage descriptor is included in additional information regarding a broadcast program whether the broadcast program regardless of whether the broadcast program is selected by a viewer, checking the remaining time of the broadcast program if the linkage descriptor is included in the additional information, displaying a channel switch notice message on a screen, determining whether or not the broadcast program has ended, switching a channel of the broadcast program to a designated channel when the broadcast program ends, and displaying a channel switch confirmation message on the screen.

8 Claims, 8 Drawing Sheets

U.S. PATENT DOCUMENTS

| | | | |
|---|---|---|---|
| 6,483,547 B1 * | 11/2002 | Eyer | 348/473 |
| 6,486,920 B2 * | 11/2002 | Arai et al. | 348/563 |
| 6,489,999 B1 * | 12/2002 | Okabe | 348/460 |
| 6,539,548 B1 * | 3/2003 | Hendricks et al. | 725/109 |
| 6,593,976 B1 * | 7/2003 | Lord | 348/731 |
| 6,606,128 B2 * | 8/2003 | Hanafee et al. | 348/563 |
| 6,741,293 B1 * | 5/2004 | Obuchi | 348/554 |
| 6,826,775 B1 * | 11/2004 | Howe et al. | 725/40 |
| 6,971,121 B2 * | 11/2005 | West et al. | 725/142 |
| 7,046,303 B2 * | 5/2006 | Idegata | 348/564 |
| 7,061,549 B1 * | 6/2006 | Mabon | 348/731 |
| 2003/0099457 A1 * | 5/2003 | Takahashi et al. | 386/46 |
| 2003/0145323 A1 * | 7/2003 | Hendricks et al. | 725/34 |
| 2003/0237100 A1 * | 12/2003 | Piotrowski | 725/135 |
| 2005/0073579 A1 * | 4/2005 | Lepine et al. | 348/100 |
| 2006/0038923 A1 * | 2/2006 | Dinwiddie | 348/569 |
| 2006/0092335 A1 * | 5/2006 | Strickland et al. | 348/731 |

FOREIGN PATENT DOCUMENTS

| | | |
|---|---|---|
| CN | 1159118 | 9/1997 |
| CN | 1347244 | 5/2002 |
| CN | 1358021 A | 7/2002 |
| JP | 2001-169267 | 6/2001 |
| JP | 2002-101352 | 4/2002 |
| WO | WO-99/55090 | 10/1999 |

* cited by examiner

DIGITAL TV METHOD FOR SWITCHING CHANNEL AUTOMATICALLY

This application claims the benefit of the Korean Application No. P2002-78822 filed on Dec. 11, 2002, which is hereby incorporated by reference.

BACKGROUND OF THE INVENTION

1. Field of the Invention

The present invention relates to a TV, and more particularly, to a digital TV and a method of automatically switching a channel thereof.

2. Discussion of the Background Art

Generally, digital broadcasts transmit additional data along with video and audio data to provide viewers with a variety of services. However, the digital broadcasts differ in bandwidths for the respective areas and has limited bandwidths in use. Hence, in order to transmit both SD (standard definition) broadcasts and HD (high definition) broadcasts (having a data size several times greater than that of the SD broadcasting) within a limited bandwidth (ex., 7 MHz in Australia), the SD broadcasts having a data size as great as the data size of the HD broadcasts should be terminated in a time zone transmitting the HD broadcasts.

If several SD broadcasts are terminated while the HD broadcast is carried out, the corresponding SD broadcasting channels are at states having no signal carried thereon. Hence, in order to avoid providing viewers with a screen in a no-signal state, the TV channel is automatically switched to another channel. Specifically, a DVB (digital video broadcasting) system (a digital broadcasting standard used in Europe and Australia) uses a linkage descriptor including information for channel switch for automatic channel shifting.

The linkage descriptor is included in PSI (program specific information) of a transport stream (hereinafter abbreviated 'TS'). A method of switching a broadcast program automatically using the linkage descriptor is explained by referring to FIG. 1 as follows.

Referring to FIG. 1, SD broadcasts (service_id=1070, 1071, 1072, and 1073) of four channels are carried out until a HD broadcast begins after 10 o'clock. Hence, three (service_id=1071, 1072, and 1073) of the SD broadcasts are terminated. Therefore, after 10 o'clock, one SD broadcast and one HD broadcast are carried out.

If the HD broadcast starts while a viewer watches the broadcast of the service ID of '1071' (service_id=1071) during SD broadcasting, the channel watched by the viewer will become a no-signal channel, that is, failing to display a broadcast video.

In order to overcome such a problem, a control unit of a TV analyses a linkage descriptor of the PSI information of a transport stream, and switches the channel to a broadcast program designated by the linkage descriptor, i.e. the broadcast program (service_id=1070) to prevent the viewer from watching the no-signal channel.

The TV according to the background art ends the SD broadcast program watched by the viewer when the HD broadcasting begins, and then switches the channel to another channel automatically, whereby the viewer is through no fault of his own) due to the abrupt change of the channel.

SUMMARY OF THE INVENTION

Accordingly, the present invention is directed to a digital TV and a method of automatically switching a channel thereof that substantially obviate one or more problems due to limitations and disadvantages of the background art.

An object of the present invention is to provide a digital TV and a method of automatically switching a channel thereof and giving advance notice to a viewer of a pending automatic channel switch using linkage descriptor information on HD broadcasting, as well as preventing the viewer from being confused by notifying the viewer of the switched channel.

Additional advantages, objects, and features of the invention will be set forth in part in the description which follows and in part will become apparent to those having ordinary skill in the art upon examination of the following, or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a digital TV according to the present invention includes a demultiplexing unit receiving a broadcast signal of a selected channel to output video information, audio information, and additional information, a video/audio processing unit receiving the video information and the audio information to output a video signal to implement video and audio signals, and in turn enabling to transmit the signals to a display unit and a speaker, respectively, a database storing the additional information, a memory storing message display video information, and a control unit outputting the message display video information stored in the memory to the video/audio processing unit when information noticing a channel switch is inputted to the database, the control unit switching the selected channel to another channel or to a program menu if a broadcast of the selected channel ends or is interrupted.

Preferably, the control unit outputs the message display video information to the video/audio processing unit to display a channel switch notice message on the display unit prior to the actual channel switch.

Preferably, the control unit outputs the message display video information to the video/audio processing unit to display a channel switch confirmation message on the display unit after the channel switch.

In another aspect of the present invention, a digital TV includes a demultiplexing unit receiving a broadcast signal of a channel selected by a viewer to output video information, audio information, and additional information, a video/audio decoder decoding the video information and the audio information, a video/audio processing unit receiving an output signal of the video/audio decoder to output video and audio signals enabling to implement video and audio, respectively, a data parsing unit parsing the additional information outputted from the demultiplexing unit, a database storing the additional information outputted from the data parsing unit, a memory storing a channel switch notice message displaying video information and a channel switch confirmation message displaying video information, and a control unit outputting the channel switch notice message displaying video information and the channel switch confirmation message displaying video information to the video/audio processing unit at set-up times respectively if a linkage descriptor is present in the additional information stored in the database, the control unit switching the channel selected by the viewer to a designated channel or to a program menu when an HD broadcast begins.

Preferably, the control unit outputs the channel switch notice message displaying video information to the video/audio processing unit before the HD broadcast begins.

Preferably, the control unit outputs the channel switch confirmation message displaying video information to the video/audio processing unit after the HD broadcast begins.

Preferably, the control unit switches the channel selected by the viewer to the channel designated by the linkage descriptor when the HD broadcast begins.

Preferably, the control unit switches the channel selected by the viewer to the channel of the HD broadcast when the HD broadcast begins.

In a further aspect of the present invention, a method of switching a channel of a digital TV automatically includes the step of determining whether or not information noticing a channel switch is included in a broadcast signal of a channel watched by a viewer, displaying a channel switch notice message on a screen before a broadcast of the channel ends if the information noticing the channel switch is included in the broadcast signal, switching the channel to another channel or to a program menu if the broadcast of the channel watched by the viewer ends or is interrupted, and displaying a channel switch confirmation message on the screen.

Preferably, the information noticing the channel switch is a linkage descriptor.

Preferably, the channel is switched to the channel designated by the information noticing the channel switch when the broadcast of the watched channel ends or is interrupted.

In another further aspect of the present invention, a method of switching a channel of a digital TV automatically includes the steps of determining whether or not a linkage descriptor is included in additional information regarding a broadcast program selected by a viewer, checking the remaining time of the broadcast program if the linkage descriptor is included in the additional information, displaying a channel switch notice message on a screen, determining whether or not the broadcast program has ended, switching a channel of the broadcast program to a designated channel or program menu when the broadcast program ends, and displaying a channel switch confirmation message on the screen.

Preferably, the remaining time of the broadcast program is determined by taking a difference between a current time and an end time of the broadcast program attained from the additional information.

Preferably, in the step of displaying the channel switch notice message on the screen, the channel switch notice message is displayed on the screen if the remaining time of the broadcast time is less than or equal to five minutes.

Preferably, in the step of determining whether the broadcast program has ended, it is determined that the broadcast program has ended if a stop flag is equal to "1".

Preferably, in the step of determining whether the broadcast program has ended, it is determined that the broadcast program has ended if a service description table (SDT) is at a "not running" state.

Preferably, a channel of the broadcast program is switched to a channel designated by the linkage descriptor.

Preferably, when the broadcast program ends and an HD broadcast begins, a channel of the broadcast program is switched to a channel of the HD broadcast.

Preferably, the method further includes the steps of determining whether an HD broadcast program is broadcasted on another channel after the channel switch confirmation message is displayed, displaying a message asking whether a channel of the broadcast program is switched to the channel of the HD broadcast program on the screen if the HD broadcast program is being broadcasted, and switching the channel of the broadcast program to either the channel of the HD broadcast program or the designated channel according to a response of the viewer to the message.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to preferred embodiments of the present invention, examples of which are illustrated in the accompanying drawings. Wherever possible, the same reference numbers will be used throughout the drawings to refer to the same or like parts.

Figure 1:
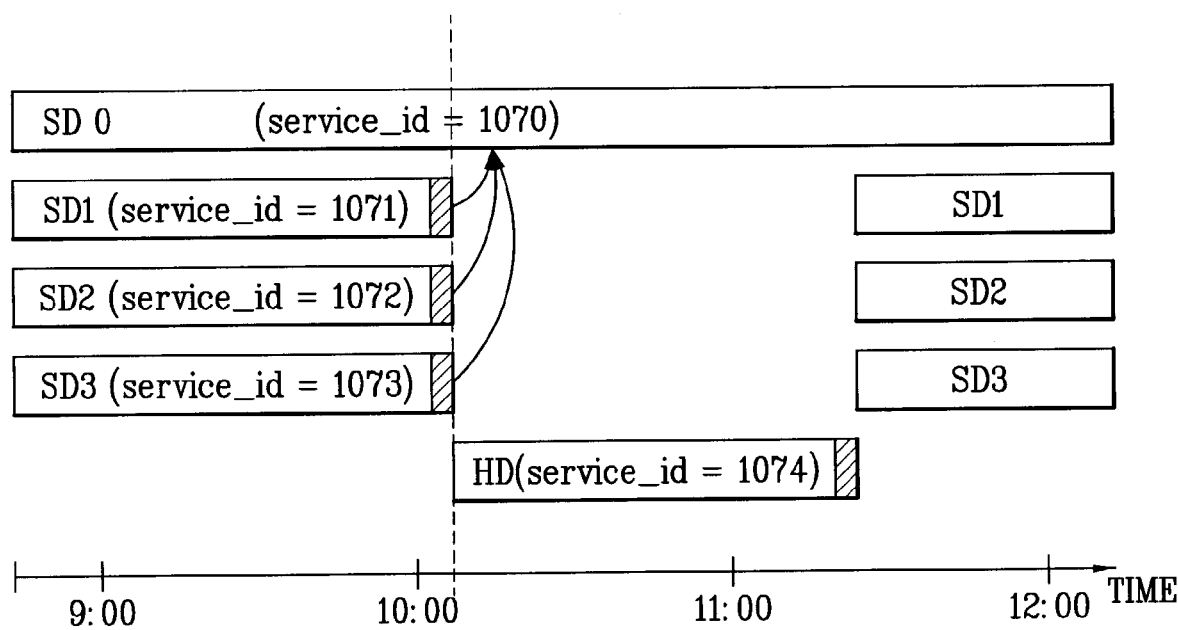
FIG. 1 illustrates a timing diagram of a automatic channel switch process of the background art.
Figure 2:
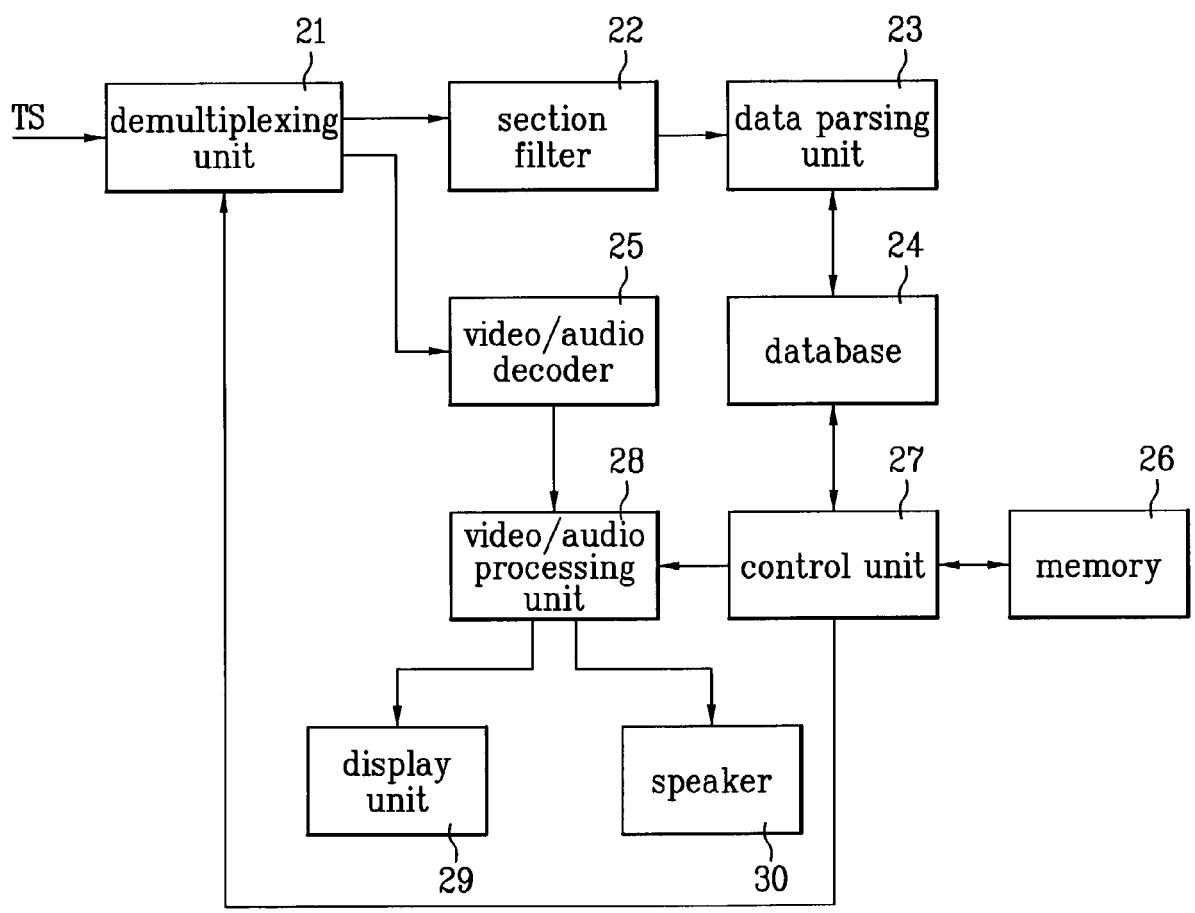
FIG. 2 illustrates a block diagram of a digital TV according to the present invention.

FIG. 2 illustrates a block diagram of a digital TV according to the present invention. Referring to FIG. 2, a broadcast signal received through an antenna (not shown in the drawing) is decoded into a transport stream TS. A demultiplexing unit 21 receiving the transport stream TS outputs video information, audio information, and additional information. In this case, the additional information includes program specific information (PSI) having program schedules, program titles, start/end times of the programs (program menus) and the like.

The additional information outputted from the demultiplexing unit 21 is inputted to a section filter 22 and is then filtered by the section filter 22. An output of the section filter 22 is inputted to a data parsing unit 23, and the data parsing unit 23 parses the output of the section filter 22. Data (additional information including PSI) parsed by the data parsing unit 23 is stored in a data base 24 with a predetermined format.

Meanwhile, the video information and audio information outputted from the demultiplexing unit 21 are inputted to a video/audio decoder 25, and are decoded by the video/audio decoder 25. A video/audio processing unit 28 having received the decoded video and audio information processes the video information and the audio information to output video and audio signals enabling to implement video and an audio, respectively. The video signal outputted from the video/audio processing unit 28 is implemented by a display unit 29 as picture and image, and the audio signal is implemented as sound and voice by a speaker 30.

A memory 26 stores video information for displaying a notice message (channel switch notice message) noticing an automatic channel switch and a message (channel switch confirmation message) noticing that a channel is switched on a screen and other information relating to operations of the TV. A control unit 27 searches the database 24 to determine whether a linkage descriptor is present in the program specific information PSI stored in the database 24, and outputs the video information for message display stored in the memory 26 to the video/audio processing unit 28 by referring to the linkage descriptor so as to correspond with a previously established timing if the linkage descriptor is present in the program specific information PSI. Moreover, the control unit 27 controls the demultiplexing unit 21 so that a broadcast program designated by the linkage descriptor or a broadcast signal of the channel selected by the viewer is displayed upon switching of the channel.

Embodiments of a method for controlling to switch a channel of the above-constituted digital TV automatically according to the present invention are explained as follows.

First Embodiment

Figure 3:
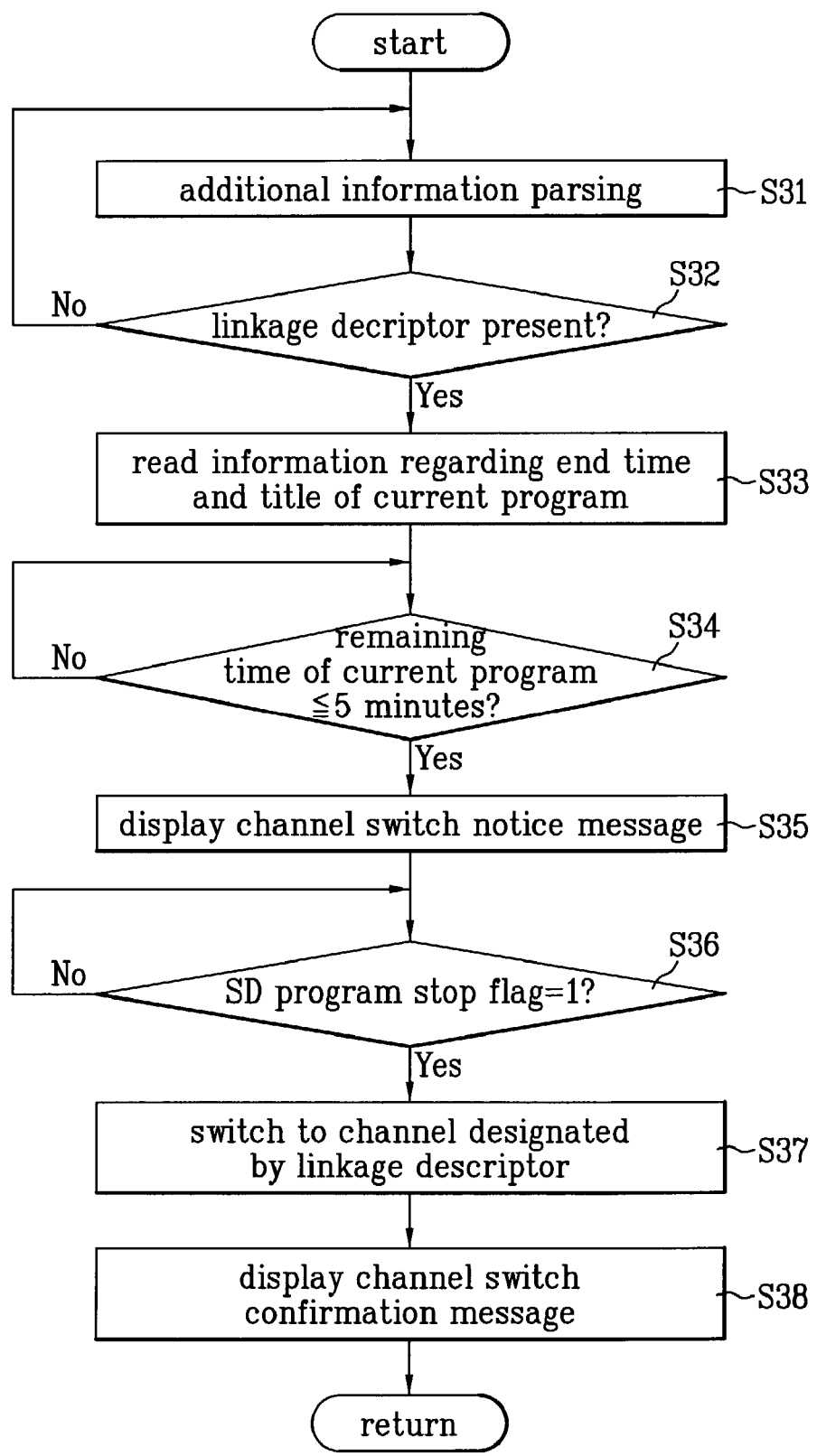
FIG. 3 illustrates a flowchart of a method of controlling to switch a channel automatically according to a first embodiment of the present invention.
Figure 4:
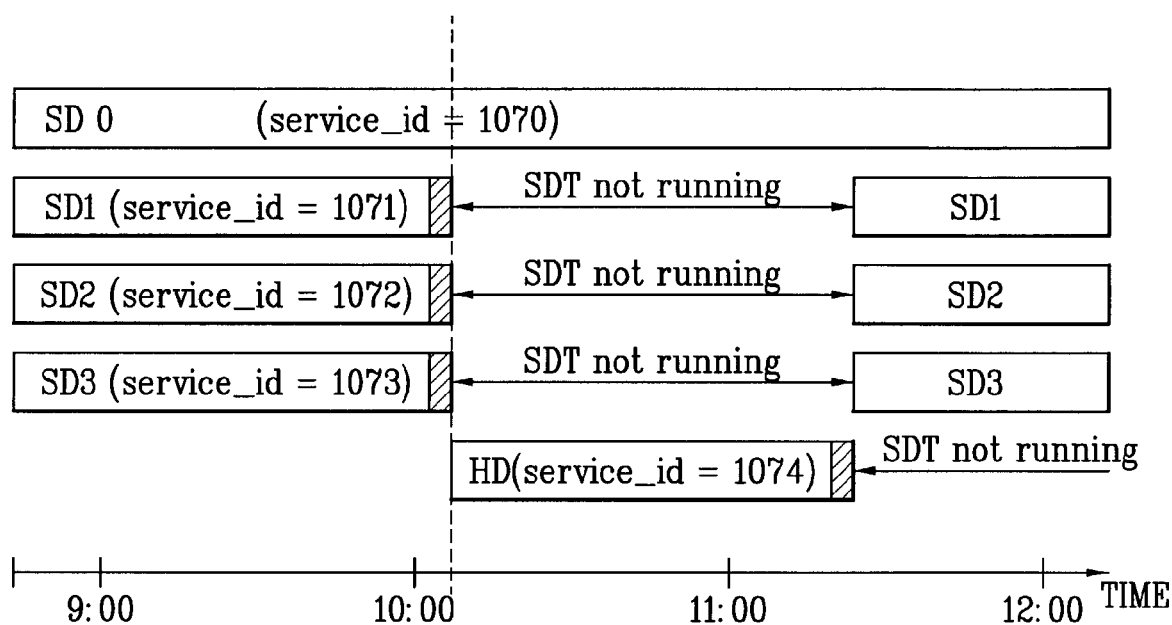
FIG. 4 illustrates a timing diagram of an automatic channel switch process according to the present invention.

FIG. 3 illustrates a flowchart of a method of controlling to switch a channel automatically according to a first embodiment of the present invention, and FIG. 4 illustrates a timing diagram of an automatic channel switch process according to the present invention.

Referring to FIG. 3, when a viewer selects a specific channel (SD broadcasting) from broadcast signals received through an antenna to designate a viewer-demanded program (for example, a program of 'ABC KIDS'), a demultiplexing unit 21 separates a transport stream TS into video information, audio information, and additional information. The demultiplexing unit 21 then outputs the video information and audio information to a video/audio decoder 25 and the additional information to a section filter 22. The video information and audio information pass the video/audio decoder 25 and a video/audio processing unit 28, and are then implemented into video and audio by a display unit 29 and a speaker 30, respectively. The additional information inputted to the section filter 22 is parsed into a setup format, and is then stored in a database 24 (S31).

Subsequently, a control unit 27 searches the database 24 to analyze PSI of the current channel watched by the viewer, thereby determining whether or not a linkage descriptor exists on the PSI (S32). The language descriptor includes information switching the channel into another channel when the broadcast program watched by the viewer ends or is interrupted to become a no-signal state. Hence, the fact that the linkage descriptor is present in the PSI means that an HD broadcast program is broadcasted after the end of the currently-watched broadcast program so that the currently-watched channel is switched to another channel designated by the linkage descriptor.

If the linkage descriptor is present in the PSI, the control unit 27 acquires information relating to an end time and a title of the broadcast program of the currently-broadcasted channel from the PSI (S33). Also, other information regarding the broadcast program of the channel designated by the linkage descriptor is read from the database 24 as well.

The control unit 27 determines whether or not the remaining time of the current program (a difference between the current time and the end time of the current program) exceeds five minutes using the information regarding the end time of the current program read from the PSI (S34). This is for determining whether or not a channel switch is to be carried out within five minutes.

Figure 7:
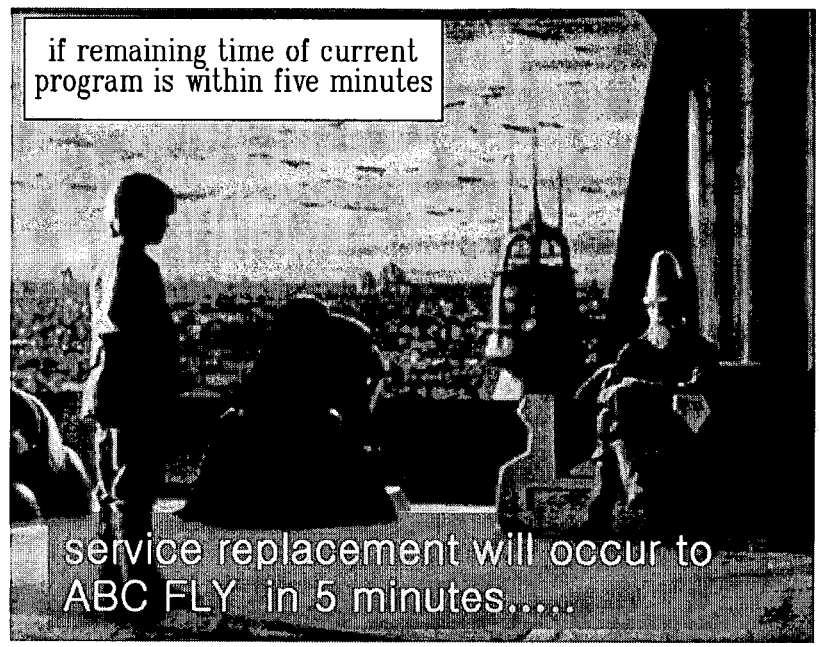
FIG. 7 illustrates an example of a screen having a channel switch notice message displayed thereon.

Thereafter, the control unit 27 reads video information regarding a channel switch notice message stored in a memory 26 if the channel switch remaining time is less than or equal to five minutes as a result of the determining (S34), and then outputs the video information to the video/audio processing unit 28. The video information regarding the channel switch notice message is represented by the channel switch notice message of "service replacement will occur to ABC FLY in 5 minutes . . . ", as shown in FIG. 7, on a screen of the display unit 29 (S35). Moreover, a title of the program designated by the linkage descriptor appears on the channel switch notice message as well.

After a predetermined time goes by, the control unit 27 determines whether or not a stop flag of the SD program for determining the end of the SD broadcast program of the current channel is equal to "1" (S36). In this case, the stop flag is included in the PSI to notice whether or not the corresponding program is ended. SDT (service description table) in the PSI of the current program can be used as another method of determining whether to terminate the SD broadcast program of the current channel. If the SDT is at a "not running" state, as shown in FIG. 4, i.e. a state in which the SDT fails to flow in TV, the corresponding program is regarded as being ended.

Once the program watched by the viewer is confirmed as being ended, the control unit 27 is switched to the channel designated by the linkage descriptor (S37) and the corresponding program, example, "ABC FLY", is broadcasted through the display unit 29. Particularly, when the SD1 broadcasting watched by the viewer ends, the channel is switched to an SD0 broadcast channel designated by the linkage descriptor.

Figure 8:
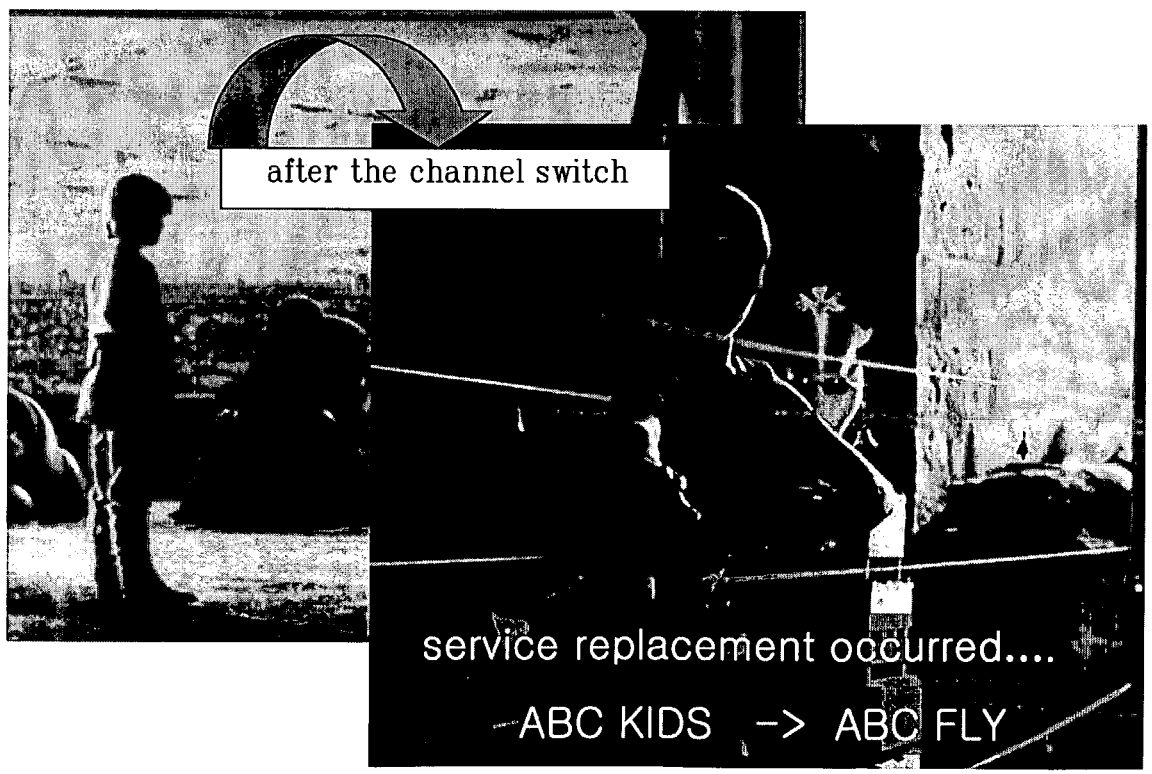
FIG. 8 illustrates a screen before channel switch and another screen having a channel switch message displayed thereon after the channel switch.

Finally, the control unit 27 reads the video information regarding a channel switch confirm message stored in the memory 26, and then outputs the video information to the video/audio processing unit 28. The video information regarding the channel switch confirm message is represented by "service replacement occurred . . . ABC KIDS", as shown in FIG. 8, on the screen of the display unit 29 (S38).

The method of controlling to switch a channel automatically according to the first embodiment of the present invention previously enables the viewer to be noticed of the fact that the channel will be switched before the channel switch due to HD broadcasting occurs, as well as to confirm the switched channel after the actual channel switch has occurred.

Second Embodiment

Figure 5:
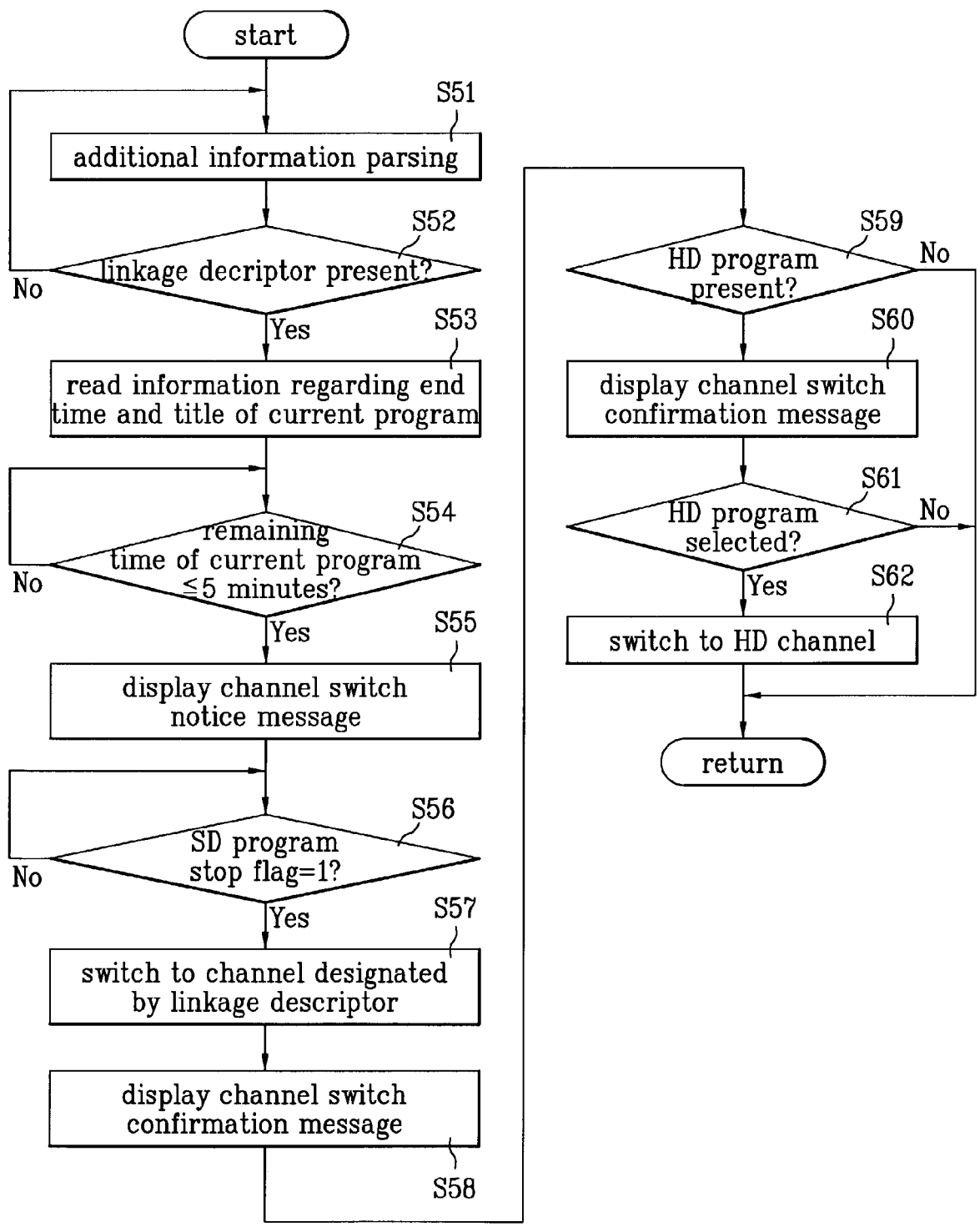
FIG. 5 illustrates a flowchart of a method of controlling to switch a channel automatically according to a second embodiment of the present invention.

FIG. 5 illustrates a flowchart of a method of controlling to switch a channel automatically according to a second embodiment of the present invention.

Referring to FIG. 5, when a viewer selects a specific channel (SD broadcasting) from broadcast signals received through an antenna to designate a viewer-demanded program, a demultiplexing unit 21 separates a transport stream TS into video information, audio information, and additional information. The demultiplexing unit 21 then outputs the video information and audio information to a video/audio decoder 25 and the additional information to a section filter 22. The additional information inputted to the section filter 22 is parsed into a setup format, and is then stored in a database 24 (S51).

Subsequently, a control unit 27 searches the database 24 to analyze PSI of the current channel program watched by the viewer, thereby determining whether a linkage descriptor exists on the PSI or not (S52). If the linkage descriptor exists on the PSI, the control unit 27 acquires information, particularly an end time and a title of the broadcast program of the currently-broadcasted channel from the PSI (S53).

The control unit 27 determines whether or not a remaining time of the current program, i.e. a difference between the current time and the end time of the current program exceeds five minutes using the information regarding the end time of the current program read from the PSI (S54). This is for determining whether or not a channel switch is carried out within five minutes.

Thereafter, the control unit 27 reads video information regarding a channel switch notice message stored in a memory 26 if the channel switch remaining time is less than or equal to five minutes, as a result of the determination (S54), and then outputs the video information to the video/audio processing unit 28. The video information regarding the channel switch notice message is represented by the channel switch notice message of "service replacement will occur to ABC FLY in 5 minutes . . . ", as shown in FIG. 7, on a screen of the display unit 29 (S55).

After a predetermined time elapses, the control unit 27 determines whether or not a stop flag of the SD program for determining the end of the SD broadcast program of the current channel is "1" (S56). Also, a SDT (service description table) in the PSI of the current program can be used as another method of determining whether to terminate the SD broadcast program of the current channel. If the SDT is at a "not running" state, as shown in FIG. 4, i.e. a state in which the SDT fails to flow in TV, the corresponding program is regarded as being ended.

Once the program watched by the viewer is determined to be ended, the control unit 27 is switched to the channel designated by the linkage descriptor (S57) and the corresponding program is broadcasted through the display unit 29. Particularly, when the SD1 broadcast being watched by the viewer ends, the channel is switched to an SD0 broadcast channel designated by the linkage descriptor.

Subsequently, the control unit 27 reads the video information regarding a channel switch confirm message stored in the memory 26, and then outputs the video information to the video/audio processing unit 28. The video information regarding the channel switch confirm message is represented by "service replacement occurred . . . ABC KIDS", as shown in FIG. 8, on the screen of the display unit 29 (S58).

Thus, when the channel is switched to another channel designated by the linkage descriptor in order to prevent the viewer from being provided with a broadcast indicating "no-signal", if the broadcast program of the switched channel is no longer present or the viewer wants to watch the HD broadcast despite the presence of the broadcast program of the switched channel, the HD broadcast program should be presented to the viewer.

Figure 9:
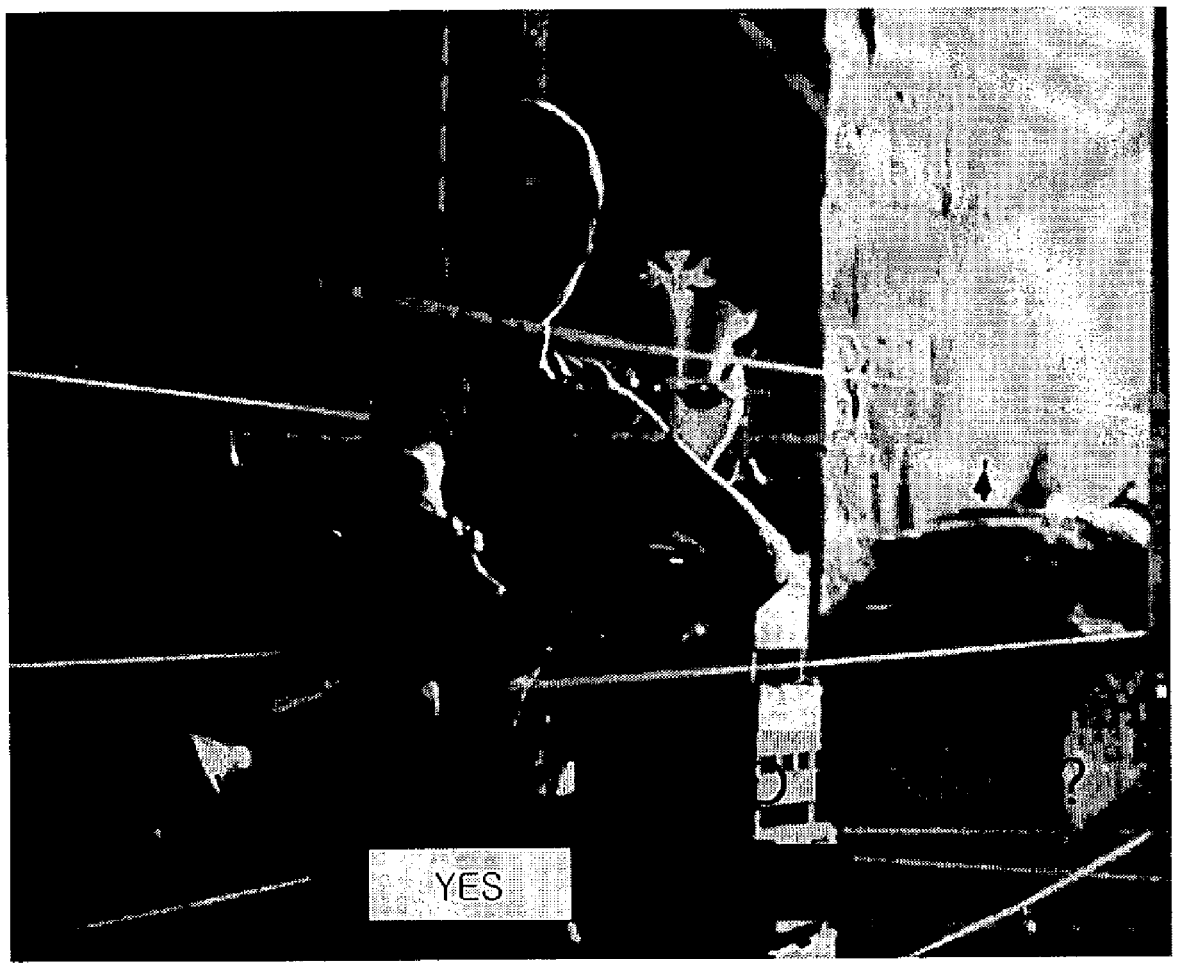
FIG. 9 illustrates an example of a screen on which a message asking whether to select a program of a switched channel is displayed.

Hence, the control unit 27 determines whether or not an HD broadcasting program is being broadcasted through another channel (S59). As a result of the determination (S59), if the HD broadcast program which is being broadcasted is present, a message (HD broadcast program selection message) asking whether or not the viewer wants to watch the HD broadcast program is displayed on the screen (S60). In this case, in order to display the message on the screen, the control unit 27 reads video information regarding the HD broadcast program selection message stored in the memory 26, and then displays the HD broadcast program selection message, for example, "Do you want to see HD program?", as shown in FIG. 9, through the display unit 29. Moreover, the control unit 27 displays "YES" and "NO" buttons enabling the viewer to select the program on the screen as well as the HD broadcast program selection message.

Thereafter, the control unit 27 determines whether or not the viewer has selected the HD broadcast program (S61). If the viewer has selected the "YES" button using an input means such as a remote controller or the like, the control unit 27 determines that the HD broadcast program has been selected, switches the previous channel to a HD broadcast channel, and displays the corresponding program on the screen (S62). On the other hand, if the viewer has selected the "NO" button, the control unit 27 determines that the HD broadcast program is not selected and displays the program of the channel designated by the linkage descriptor on the screen, which can be the same type of program as the program that has ended.

Third Embodiment

Figure 6:
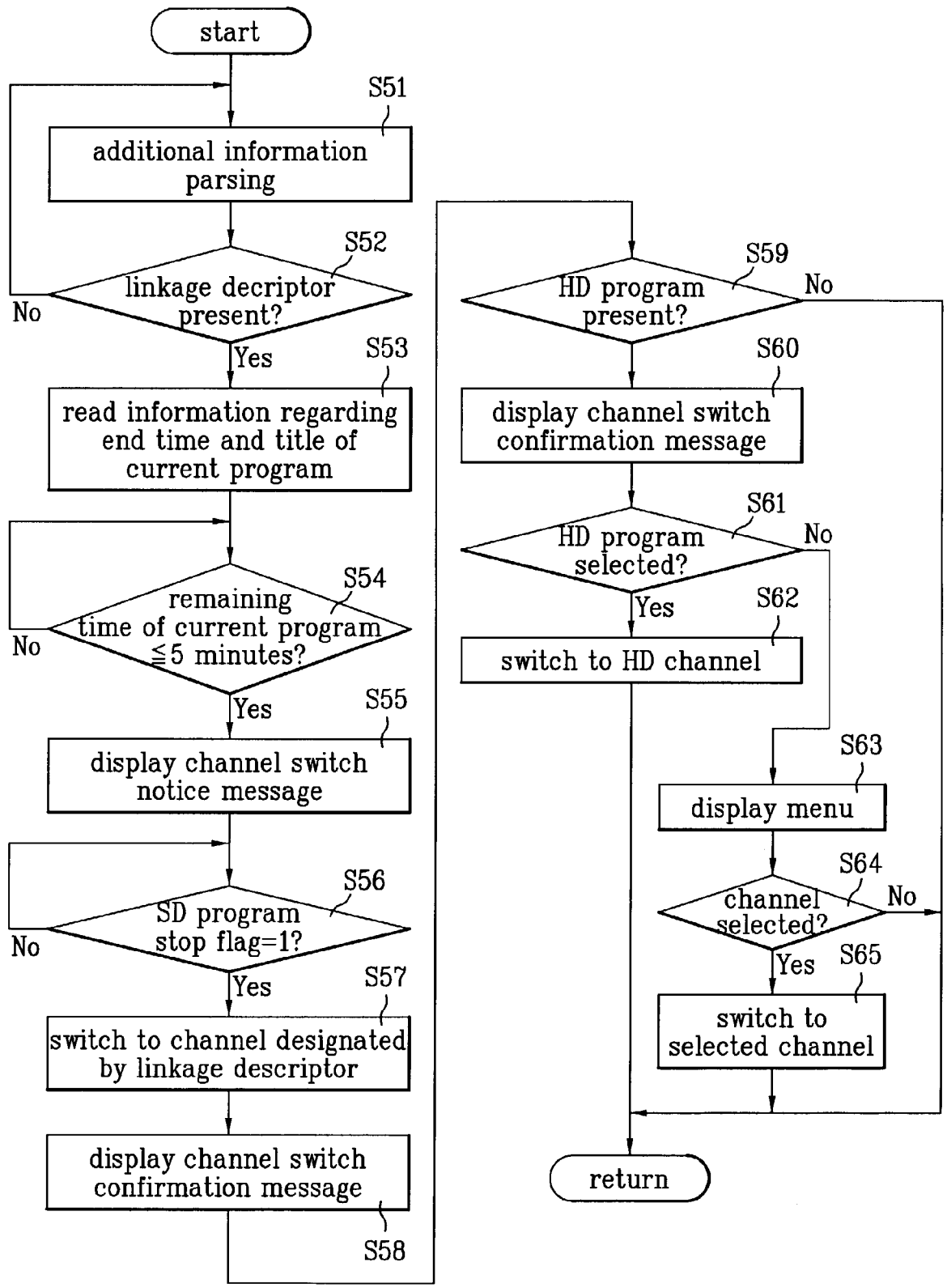
FIG. 6 illustrates a flowchart of a method of controlling to switch a channel automatically according to a third embodiment of the present invention.

FIG. 6 illustrates a flowchart of a method of controlling to switch a channel automatically according to a third embodiment of the present invention.

Referring to FIG. 6, when a viewer selects a specific channel (SD broadcasting) from broadcast signals received through an antenna to designate a viewer demanded program, a demultiplexing unit 21 separates a transport stream TS into video information, audio information, and additional information. The demultiplexing unit 21 then outputs the video information and audio information to a video/audio decoder 25 and the additional information to a section filter 22. The additional information inputted to the section filter 22 is parsed into a setup format, and is then stored in a database 24 (S51).

Subsequently, a control unit 27 searches the database 24 to analyze PSI of the current channel program watched by the viewer, thereby determining whether a linkage descriptor exists on the PSI or not (S52). If the linkage descriptor exists on the PSI, the control unit 27 acquires information, particularly an end time and a title of the broadcast program of the currently-broadcasted channel from the PSI (S53).

The control unit 27 determines whether or not a remaining time of the current program, i.e. a difference between the current time and the end time of the current program exceeds five minutes using the information regarding the end time of the current program read from the PSI (S54). This is for determining whether or not a channel switch is carried out within five minutes.

Thereafter, the control unit 27 reads video information regarding a channel switch notice message stored in a memory 26 if the channel switch remaining time is less than or equal to five minutes, as a result of the determination (S54), and then outputs the video information to the video/audio processing unit 28. The video information regarding the channel switch notice message is represented by the channel switch notice message of "service replacement will occur to ABC FLY in 5 minutes . . . ", as shown in FIG. 7, on a screen of the display unit 29 (S55).

After a predetermined time elapses, the control unit 27 determines whether or not a stop flag of the SD program for determining the end of the SD broadcast program of the current channel is "1" (S56). Also, a SDT (service description table) in the PSI of the current program can be used as another method of determining whether to terminate the SD broadcast program of the current channel. If the SDT is at a "not running" state, as shown in FIG. 4, i.e. a state in which the SDT fails to flow in TV, the corresponding program is regarded as being ended.

Once the program watched by the viewer is determined to be ended, the control unit 27 is switched to the channel designated by the linkage descriptor (S57) and the corresponding program is broadcasted through the display unit 29. Particularly, when the SD1 broadcast being watched by the viewer ends, the channel is switched to an SD0 broadcast channel designated by the linkage descriptor.

Subsequently, the control unit 27 reads the video information regarding a channel switch confirm message stored in the memory 26, and then outputs the video information to the video/audio processing unit 28. The video information regarding the channel switch confirm message is represented by "service replacement occurred . . . ABC KIDS", as shown in FIG. 8, on the screen of the display unit 29 (S58).

Thus, when the channel is switched to another channel designated by the linkage descriptor in order to prevent the viewer from being provided with a broadcast indicating "no-signal", if the broadcast program of the switched channel is no longer present or the viewer wants to watch the HD broadcast despite the presence of the broadcast program of the switched channel, the HD broadcast program should be presented to the viewer.

Hence, the control unit 27 determines whether or not an HD broadcasting program is being broadcasted through another channel (S59). As a result of the determination (S59), if the HD broadcast program which is being broadcasted is present, a message (HD broadcast program selection message) asking whether or not the viewer wants to watch the HD broadcast program is displayed on the screen (S60). In this case, in order to display the message on the screen, the control unit 27 reads video information regarding the HD broadcast program selection message stored in the memory 26, and then displays the HD broadcast program selection message, for example, "Do you want to see HD program?", as shown in FIG. 9, through the display unit 29. Moreover, the control unit 27 displays "YES" and "NO" buttons enabling the viewer to select the program on the screen as well as the HD broadcast program selection message.

Thereafter, the control unit 27 determines whether or not the viewer has selected the HD broadcast program (S61). If the viewer has selected the "YES" button using an input means such as a remote controller or the like, the control unit 27 determines that the HD broadcast program has been selected, switches the previous channel to a HD broadcast channel, and displays the corresponding program on the screen (S62). On the other hand, if the viewer has selected the "NO" button, the control unit 27 then searches additional information stored in database 24, including program specific information (PSI) having program schedules, program titles, program types and start/end times of the programs (program menus) and displays a channel broadcasting program specific information or a program selection menu, which can include programs of a same type as the terminated or interrupted program. A viewer may then select a channel of choice (S63).

If the viewer makes a selection based on the program menu or manually switches to another channel, then the control unit yields control to the viewer (S64/S65). If a selection is not made by the viewer, then the control unit 27 determines that the current broadcast program has been selected (channel designated by the linkage descriptor) and displays the program on the channel designated by the linkage descriptor (S57).

Accordingly, the digital TV and method according the present invention controls to automatically switch a channel, notices the viewer of the channel switch prior to the automatic channel switch in accordance with the linkage descriptor information, and displays the message of noticing the channel switch on the screen after the channel switch. Therefore, the present invention eliminates the confusion resulting from a channel switch that the viewer fails to recognize.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method of switching a channel of a digital TV automatically, comprising:
   (a) determining whether or not information noticing a channel switch is included in additional information about a broadcast program selected by a viewer;
   (b) checking a remaining time of the broadcast program if the information noticing a channel switch is included in the additional information;
   (c) displaying a channel switch notice message on a screen;
   (d) determining whether or not the broadcast program has ended;
   (e) switching a channel of the broadcast program to a designated channel when the broadcast program ends;
   (f) displaying a channel switch confirmation message on the screen;
   (g) determining whether an HD broadcast program is broadcasted on another channel after the channel switch confirmation message is displayed;
   (h) displaying a message on the screen asking whether a channel of the broadcast program is switched to the channel of the HD broadcast program, if the RD broadcast program is being broadcasted; and
   (i) switching the channel of the broadcast program to either the channel of the HD broadcast program or the designated channel according to a response of the viewer to the message.

2. The method of claim 1, wherein the remaining time of the broadcast program is found by a difference between a current time and an end time of the broadcast program attained from the additional information.

3. The method of claim 1, wherein, in the step of displaying the channel switch notice message on the screen, the channel switch notice message is displayed on the screen if the remaining time of the broadcast time is less than or equal to five minutes.

4. The method of claim 1, wherein, in the step of determining whether the broadcast program has ended, it is determined that the broadcast program has ended if a stop flag is "g1".

5. The method of claim 1, wherein, in the step of determining whether the broadcast program has ended, it is determined that the broadcast program has ended if a service description table (SDT) is at a "not running" state.

6. The method of claim 1, wherein information noticing a channel switch is a linkage descriptor, and a channel of the broadcast program is switched to a channel designated by the linkage descriptor.

7. The method of claim 1, wherein, when the broadcast program ends and an HD broadcast begins, a channel of the broadcast program is switched to a channel of the HD broadcast.

8. The method of claim 1, further comprising:
displaying a program menu or switching to a channel displaying program information if a HD program is not selected by the viewer;
selecting a channel from the program menu; and
switching to the selected channel.

* * * * *